US008414168B2

(12) United States Patent
Jutila et al.

(10) Patent No.: US 8,414,168 B2
(45) Date of Patent: Apr. 9, 2013

(54) ROOF RACK ASSEMBLY WITH INTEGRATED LIGHTING

(75) Inventors: Brian J. Jutila, Richmond, MI (US); Robert E. Boniface, Bloomfield Hills, MI (US); Jeffrey A. Diegel, South Lyon, MI (US); Joel T. Bachler, Rochester, MI (US); Ronald J. Wojciechowski, Sterling Heights, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 161 days.

(21) Appl. No.: 12/852,979

(22) Filed: Aug. 9, 2010

(65) Prior Publication Data

US 2012/0031939 A1    Feb. 9, 2012

(51) Int. Cl.
*B60Q 1/00*    (2006.01)
(52) U.S. Cl.
USPC ............................................ 362/493; 362/487
(58) Field of Classification Search .................. 362/484, 362/493, 495, 505, 576, 511
See application file for complete search history.

(56) References Cited

U.S. PATENT DOCUMENTS

| 4,426,028 A * | 1/1984 | Bott ............................... 224/325 |
| 4,722,030 A * | 1/1988 | Bowden ......................... 362/493 |
| 4,800,470 A * | 1/1989 | Hartsaw ........................ 362/493 |
| 5,171,083 A * | 12/1992 | Rich .............................. 362/493 |
| 5,495,400 A * | 2/1996 | Currie ........................... 362/551 |
| 5,779,228 A | 7/1998 | Hansen |
| 6,114,954 A * | 9/2000 | Palett et al. .................... 340/475 |
| 7,081,810 B2 * | 7/2006 | Henderson et al. ........... 340/435 |
| 7,261,446 B2 | 8/2007 | Thomas |
| 7,914,189 B2 * | 3/2011 | Sugiura et al. ................ 362/501 |
| 2006/0114684 A1 | 6/2006 | Marquez |
| 2007/0008732 A1 | 1/2007 | Robertson et al. |
| 2007/0217212 A1 * | 9/2007 | Klinkman et al. ............. 362/493 |

FOREIGN PATENT DOCUMENTS

DE    202008013478 U1    3/2010
JP    2007230380 A    9/2007

OTHER PUBLICATIONS

German Patent & Trademark Office. German Office Action for Patent No. 10 2011 080 578.8 dated Jan. 15, 2013.

* cited by examiner

*Primary Examiner* — Robert May
(74) *Attorney, Agent, or Firm* — Ingrassia Fisher & Lorenz, P.C.

(57) ABSTRACT

A roof rack assembly for a vehicle having a roof is presented here. The roof rack assembly includes a first stanchion for structural attachment to the roof, a second stanchion for structural attachment to the roof, and a bar coupled between, and held above the roof by, the first stanchion and the second stanchion. The bar has a securing feature integrally formed therein, which holds an electric powered light-emitting component. Accordingly, the roof rack assembly employs a roof rack bar having a light-emitting element integrated therein.

19 Claims, 7 Drawing Sheets

−PRIOR ART−

−PRIOR ART−

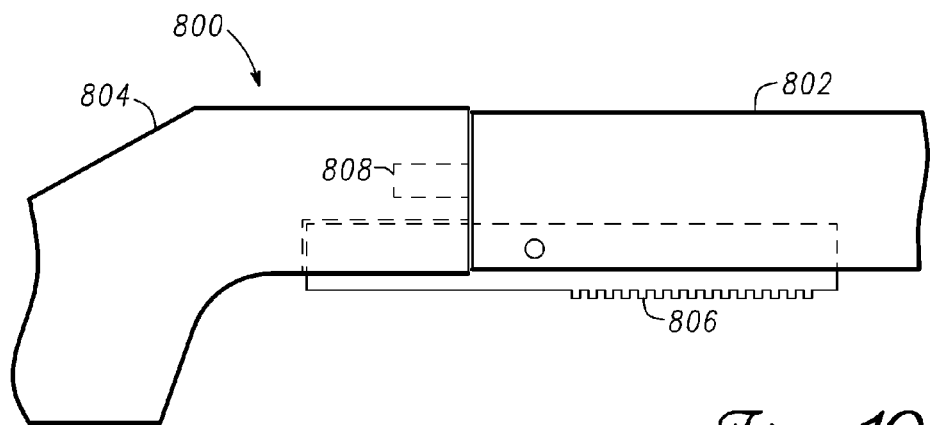
Fig. 10
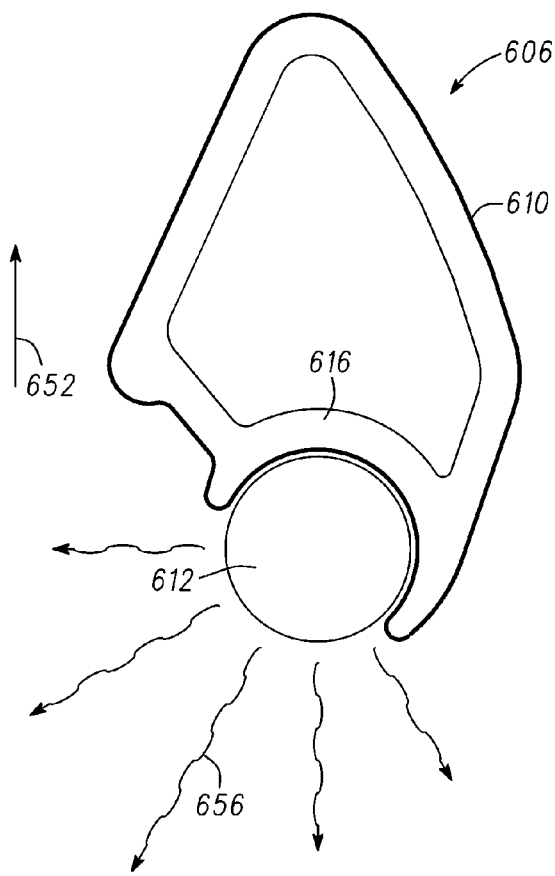
Fig. 11

ROOF RACK ASSEMBLY WITH INTEGRATED LIGHTING

TECHNICAL FIELD

Embodiments of the subject matter described herein relate generally to vehicle roof rack systems. More particularly, embodiments of the subject matter relate to a roof rack that includes at least one light-emitting roof rack bar integrated therein.

BACKGROUND

Automobiles such as sport utility vehicles (SUVs), minivans, and station wagons are often manufactured with integrated roof rack systems designed to hold, carry, and otherwise accommodate luggage, sporting equipment, boxes, and other items. A typical roof rack system might include two longitudinal rails or bars that are rigidly mounted near the driver and passenger sides of the vehicle. Each rail can be held above the roof by any number of stanchions or pedestals. For example, the front end of a rail may be secured to the roof using a front stanchion, and the rear end of the rail may be secured to the roof using a rear stanchion.

BRIEF SUMMARY

A roof rack assembly is provided for a vehicle having a roof and an electric power supply. The roof rack assembly includes a stanchion for structural attachment to the roof, a bar having an end coupled to the stanchion such that the stanchion maintains the end above the roof, an illumination element integrated with the bar, and an illumination electronics module to drive the illumination element. The illumination electronics module is powered by the electric power supply of the vehicle.

Another roof rack assembly is provided for a vehicle having a roof. The roof rack assembly includes a first stanchion for structural attachment to the roof, a second stanchion for structural attachment to the roof, and a bar coupled between, and held above the roof by, the first stanchion and the second stanchion. The bar has a securing feature integrally formed therein. The roof rack assembly also includes an electric powered light-emitting component attached to the bar and held by the securing feature.

A vehicle is also provided. The vehicle includes a roof, a first stanchion attached to and supported by the roof, a second stanchion attached to and supported by the roof, and a light-emitting roof rack bar coupled between, and held above the roof by, the first stanchion and the second stanchion. The vehicle also includes an illumination electronics module to drive the light-emitting roof rack bar, and an onboard power supply to provide operating power to the illumination electronics module.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 10 is a schematic and partially phantom side view of an exemplary embodiment of a roof rack assembly having a rotatable light-emitting bar;

FIG. 11 is a cross sectional view that depicts the light-emitting bar shown in FIG. 8 in a first rotated position.

DETAILED DESCRIPTION

Figure 1:
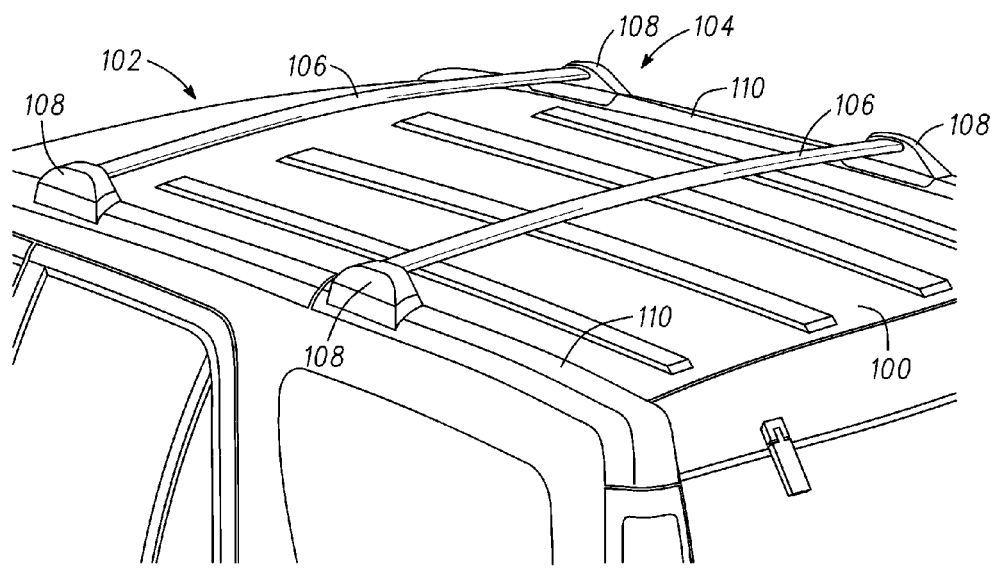
FIG. 1 is a perspective view of a roof of a vehicle having a conventional roof rack.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology may also be used in the following description for the purpose of reference only, and thus are not intended to be limiting. For example, terms such as "upper," "lower," "above," and "below" refer to directions in the drawings to which reference is made. Terms such as "front," "back," "rear," "side," "outboard," and "inboard" describe the orientation and/or location of portions of a component or element within a consistent but arbitrary frame of reference which is made clear by reference to the text and the associated drawings describing the component or element under discussion. Such terminology may include the words specifically mentioned above, derivatives thereof, and words of similar import. Similarly, the terms "first," "second," and other such numerical terms referring to structures do not imply a sequence or order unless clearly indicated by the context.

FIG. 1 is a perspective view of a roof 100 of a vehicle 102 having a conventional roof rack 104 mounted thereon. This particular roof rack 104 includes two crossbeams 106 that span the roof 100 from side to side. Each crossbeam 106 is supported by two stanchions 108, which serve as pedestals for the crossbeams 106. The stanchions 108 are coupled to the roof 100 via two side rail elements 110, which may be realized as a portion of the roof 100, as a structural frame member, as a trim piece, or the like.

Figure 2:
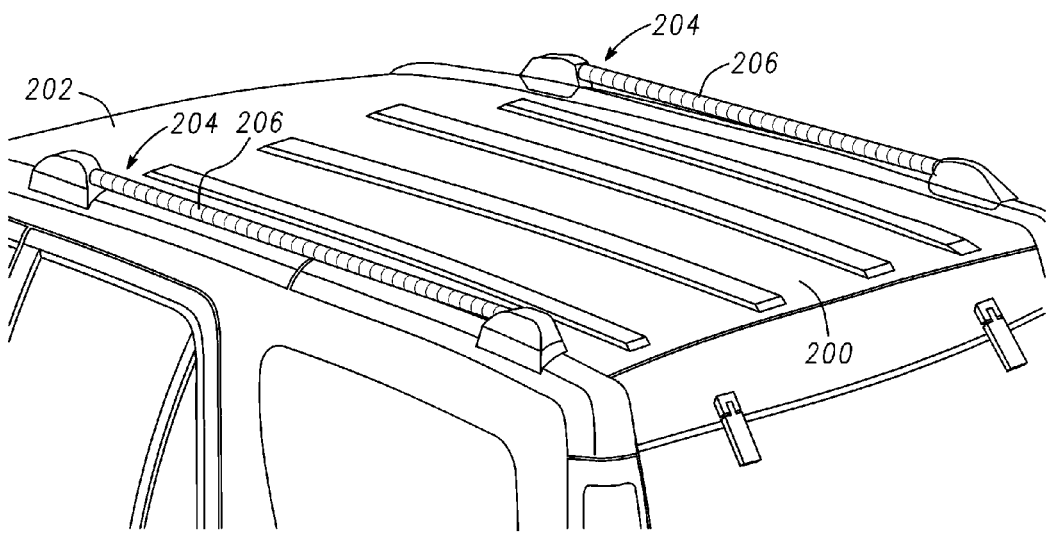
FIG. 2 is a perspective view of a roof of a vehicle having a conventional roof rack.

FIG. 2 is a perspective view of a roof 200 of another vehicle 202 having a conventional roof rack 204 mounted thereon. In contrast to the roof rack 104 shown in FIG. 1, the roof rack 204 includes two side bars 206 arranged in the major longitudinal direction of the vehicle 202, i.e., in the normal direction of travel. Each bar 206 is supported by two stanchions 208, which are coupled to the roof 200 in any appropriate manner.

The embodiments described below include at least one light-emitting element as an integrated feature or component of a roof rack. Notably, the technology and subject matter described in more detail below can be utilized with crossbeams of the type shown in FIG. 1 and/or with side bars of the type shown in FIG. 2. For example, the side bars and/or the cross beams of a roof rack may include an illumination element integrated therein. Moreover, the technology and subject matter described here can be utilized with other elements, components, and features of a vehicle roof rack system if so desired.

A light source incorporated into a roof rack (e.g., as a factory standard accessory) has several beneficial and desirable uses. For example, roof rack lighting could be remotely activated by the user to help locate the vehicle in a parking lot. As another example, roof rack lighting could be activated in dark environments for safety, comfort, and/or in lieu of a flashlight or lantern. As yet another example, lights on the side bars of a roof rack could be used as turn signal indicators, running lights, hazard lights, or the like.

In certain embodiments, a crossbeam or a side bar is extruded, roll formed, or molded such that it can accommodate an illumination element. The illumination element could be a light string, a light filament, a flexible tube with a series of light bulbs, or the like. The light-emitting roof rack component could be manufactured with stanchions that house the light source or emitter, the electronics module that controls the light-emitting element, switches, and/or other functional components associated with the roof rack component. Indeed, the light-emitting roof rack component could be provided as a self-contained and ready to install unit that only requires mounting to the vehicle roof and connection to the vehicle power supply.

The light-emitting roof rack component may be rotatably coupled between stanchions or pedestals to accommodate adjustment of the light beam, pattern, or field. For example, a lighted side bar could be twisted in one direction such that the center portion of the roof is well illuminated, and twisted in the other direction such that the side of the vehicle or the area next to the vehicle is well illuminated.

Figure 3:
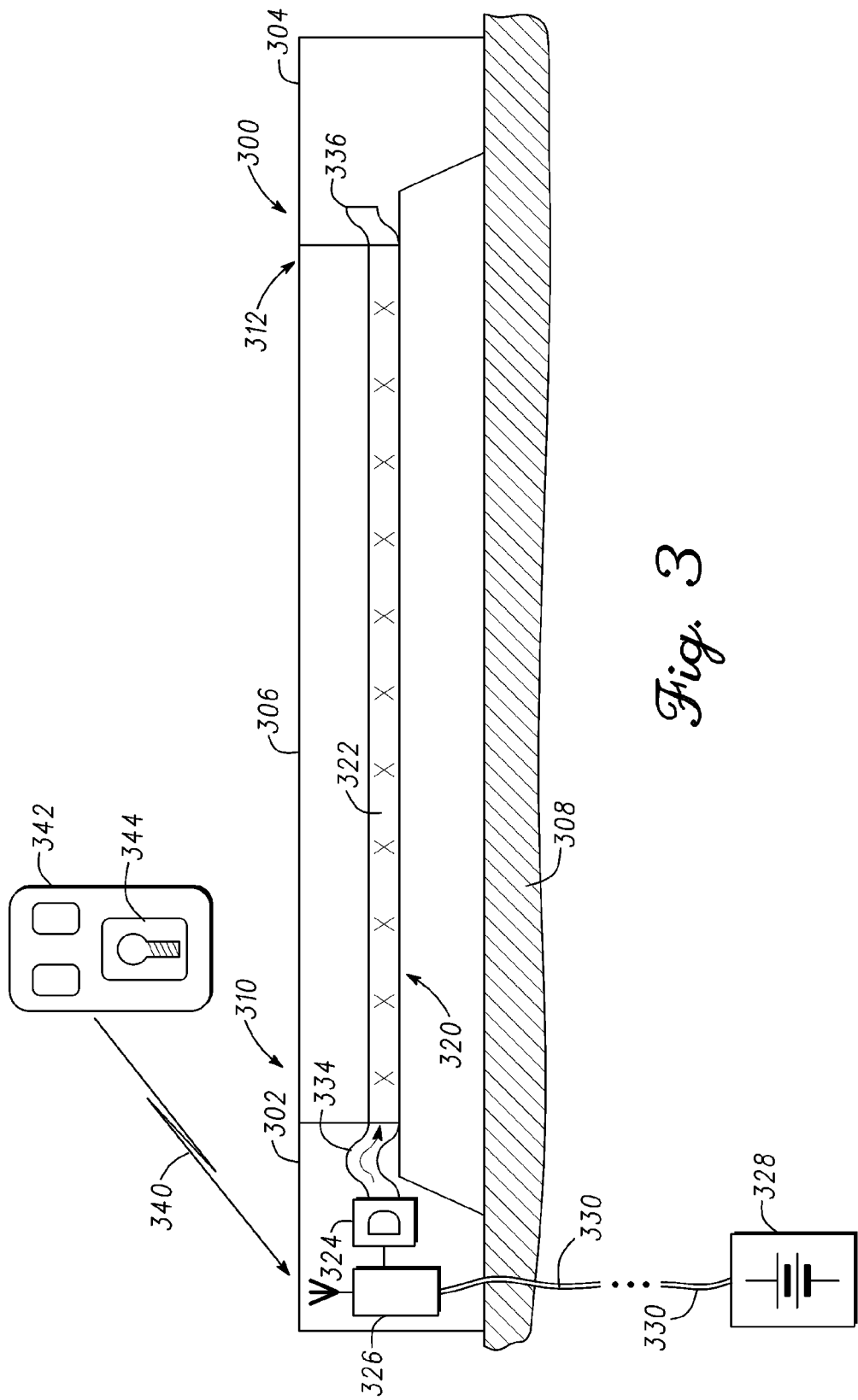
FIG. 3 is a simplified schematic representation of a roof rack assembly according to an exemplary embodiment of the invention.

FIG. 3 is a simplified schematic representation of an exemplary embodiment of a roof rack assembly 300 for a vehicle. The roof rack assembly 300 generally includes, without limitation: a first stanchion 302; a second stanchion 304; and a light-emitting roof rack bar 306 coupled between the first and second stanchions 302, 304. FIG. 3 depicts a portion of a roof 308 upon which the roof rack assembly 300 is mounted. The first and second stanchions 302, 304 are each designed and configured for structural attachment and mounting to the roof 308. Thus, the first and second stanchions 302, 304 are attached to and supported by the roof 308. In practice, the first and second stanchions 302, 304 can be mounted to a structural frame element of the host vehicle using any conventional attachment mechanism, technology, or technique. For example, the first and second stanchions 302, 304 may be secured to the roof 308 using fasteners (such as bolts, clips, or screws), via a press fit engagement, by bonding or welding, etc. In certain implementations, the positions of the first and second stanchions 302, 304 are adjustable (in the fore-aft direction or the side-to-side direction) on the roof 308, as is well understood.

Each of the first and second stanchions 302, 304 may be realized as a structural frame and a shell, cover, or trim piece that at least partially covers and houses the structural frame. The structural frame is formed from a strong and tough material such as metal, and the shell may be formed from any suitable material such as metal, plastic, or a composite. Notably, the shell could be used as a protective housing for certain devices or elements of the roof rack assembly 300, e.g., electronics, a switch, a power supply, a light-emitting element, or the like.

The bar 306 is coupled between the first and second stanchions 302, 304, which hold the bar 306 above the roof 308. For the illustrated embodiment, the bar has a first end 310 coupled to the first stanchion 302 and a second end 312 coupled to the second stanchion 304. Thus, the first stanchion 302 maintains the first end 310 above the roof 308, and the second stanchion 304 maintains the second end 312 above the roof 308. In certain embodiments, the bar 306 is rotatably coupled between the first and second stanchions 302, 304 to accommodate directional adjustment of light emitted by the bar 306. This rotating feature is described in more detail below.

Notably, the roof rack assembly 300 includes an illumination element 320 integrated with the bar 306. The illumination element 320 may be integrally formed into the bar 306, secured and attached to the bar 306, enclosed within the bar, molded into the bar 306, or the like. As one example, the illumination element 320 could be realized as an electric powered light-emitting component that is attached to the bar 306. In one preferred embodiment, the illumination element 320 includes an illumination tube 322 (or solid composition) integrated with the bar 306 and at least one light-emitting element 324 to illuminate the illumination tube 322. The illumination tube 322 may be realized as a transparent or translucent flexible filament that is capable of propagating light along its longitudinal dimension, while emitting light from its sides. The flexible nature of the illumination tube 322 is desirable to accommodate normal bending and flexing of the bar 306 under various loading conditions. Moreover, the illumination tube 322 need not contain any electrical components, light bulbs or light-emitting elements, or other active elements. Rather, the illumination tube 322 for this embodiment merely serves as a conduit and light-transferring filament for the light-emitting element 324. In alternate embodiments, the illumination element 320 may utilize a string of individual light bulbs (e.g., light emitting diodes (LEDs)) or other means for lighting the bar 306.

For this particular embodiment, the light-emitting element 324 is realized with one or more LEDs that are suitably configured to project light into the illumination tube 322. The light-emitting element 324 may be driven by an appropriate illumination electronics module 326 that controls the activation and operation of the light-emitting element 324. In practice, the illumination electronics module 326 and/or the light-emitting element 324 may be powered by an onboard electric power supply 328 of the host vehicle. Accordingly, the illumination electronics module 326 may be electrically connected to the power supply 328 via one or more conductors 330. In typical deployments, the power supply 328 corresponds to the primary DC supply of the vehicle, e.g., a twelve volt battery. In other embodiments, the light-emitting roof rack bar 306 receives operating power from an onboard power supply other than the primary battery of the vehicle. For example, the illumination electronics module 326 and/or the light-emitting element 324 could receive operating power from a devoted power supply.

In certain embodiments, one (or both) of the stanchions 302, 304 could be used as a housing for a portion of the illumination tube 322, the light-emitting element 324, and/or the illumination electronics module 326. As schematically depicted in FIG. 3, the light-emitting element 324 and the illumination electronics module 326 are housed within the first stanchion 302. Alternatively, one or both of these components could be housed within the second stanchion 304. The light-emitting element 324 is optically coupled to a first end 334 of the illumination tube 322. Accordingly, the first end 334 of the illumination tube 322 resides within the first stanchion 302. A second end 336 of the illumination tube 322 may extend into the second stanchion 304.

It should be appreciated that the light-emitting roof rack bar 306 may utilize one or more additional light-emitting elements and associated illumination electronics modules if so desired. For example, it may be desirable to have a second light-emitting element and a second illumination electronics module to also project light into the second end 336 of the illumination tube 322. In yet another embodiment, the roof rack assembly 300 may include two (or more) light-emitting roof rack bars that are joined by a third stanchion located between the first and second stanchions 302, 304. In such an embodiment, each of the light-emitting roof rack bar segments can be independently driven and illuminated if so desired.

The illumination electronics module 326 is suitably configured to control the operation of the light-emitting roof rack bar 306. In this regard, the illumination electronics module 326 may include or cooperate with one or more of the following items, without limitation: a processor; a memory element; a wireless receiver; a switch or actuator; voltage conversion or conditioning components or circuitry; a timer; operating or application software; control logic or instructions, etc. The illumination electronics module 326 may be provided as an integrated component of the roof rack assembly 300 (as depicted in FIG. 3), or it may be deployed as part of another electronic control module of the host vehicle. Depending upon the particular embodiment and/or the specific operating conditions, the illumination electronics module 326 responds to commands, instructions, and/or control signals in an appropriate manner to perform or execute one or more of the following: turn the light-emitting roof rack bar 306 on or off; adjust the brightness of the light generated by the bar 306; change, adjust, or select the color of light generated by the bar 306; change, adjust, or select a flicker or flashing pattern of the light generated by the bar 306; control the rotation or other adjustable positioning of the bar 306; etc.

In certain embodiments, the illumination electronics module 326 drives or otherwise controls the illumination element 320 in response to remote key fob commands 340 received at the vehicle. The remote key fob commands 340 might be received at a receiver of the illumination electronics module 326, or at another onboard receiver, processor, or communication module that is otherwise used to support key fob commands. The remote key fob commands 340 may be generated by a key fob 342 carried by the user. For example, the key fob 342 may include a "light" button 344 that is assigned to the roof rack assembly 300, or it may support a particular sequence or pattern of button presses for purposes of controlling the light-emitting roof rack bar 306. As another example, the illumination element 320 could be activated in response to one or more of the following types of remote key fob commands 340, without limitation: vehicle lock; vehicle unlock; enable vehicle alarm; disable vehicle alarm; activate panic alarm; remote engine start; and remote window adjustment. Key fob operation allows the user to remotely activate and deactivate the lights in the bar 306. In other embodiments, remote control commands could be generated by a device such as a wireless phone, a digital media player, a portable video game, a wireless computing device, or the like.

Figure 4:
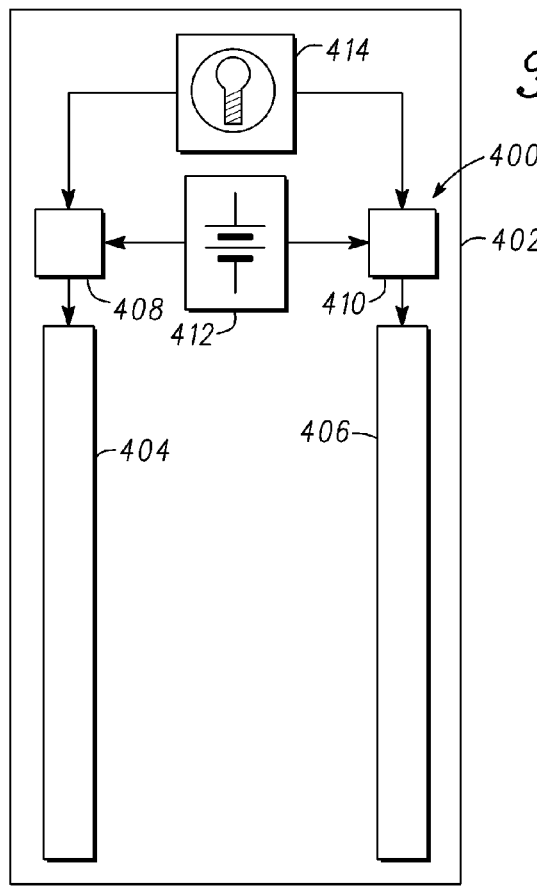
FIG. 4 is another schematic representation of a roof rack assembly according to an exemplary embodiment of the invention.

FIG. 4 is a schematic representation of a roof rack assembly 400 for a vehicle 402. The roof rack assembly 400 includes a driver side light-emitting roof rack bar 404 and a passenger side light-emitting roof rack bar 406. The driver side bar 404 is driven by a first emitter 408, and the passenger side bar 406 is driven by a second emitter 410. The two emitters 408, 410 may be powered by the main onboard vehicle power supply 412, as described above. For the sake of clarity and simplicity, the associated illumination electronics modules (or module) are not shown in FIG. 4.

For this embodiment, the light-emitting bars 404, 406 are controlled and driven in response to user manipulation of at least one onboard user interface element 414 of the vehicle. In this regard, the user interface element 414 may be realized using a button, a switch, a lever, a touch screen or touch pad control icon, a voice activation feature, or the like. For example, the user interface element 414 may include one button or switch to control the driver side bar 404 and another button or switch to control the passenger side bar 406. The user interface element 414 may be devoted to the light-emitting bars 404, 406, or it could be implemented with a switch or other user interface element that is also used to control interior or running lights of the vehicle. It should be appreciated that the user interface element 414 could be used in place of, or in addition to, the key fob 342 (see FIG. 3) for purposes of controlling the light-emitting bars 404, 406.

Figure 5:
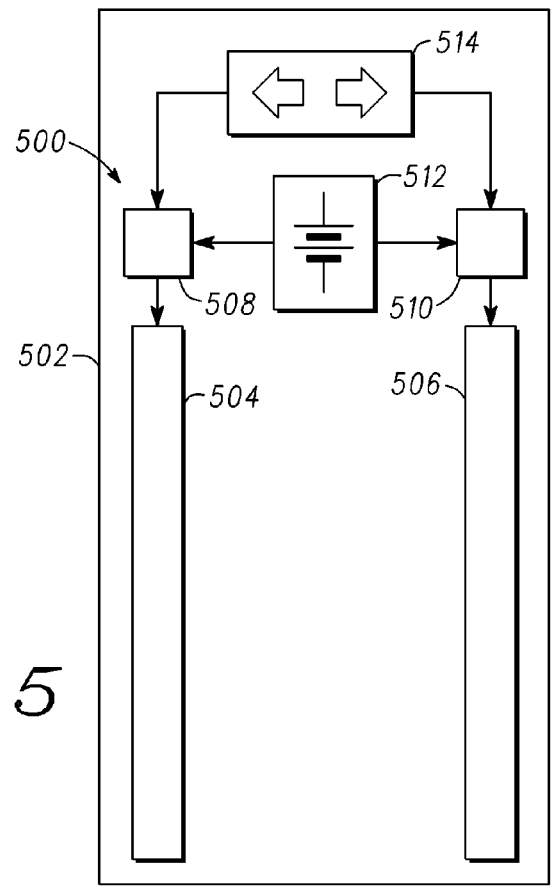
FIG. 5 is yet another schematic representation of a roof rack assembly according to an exemplary embodiment of the invention.

FIG. 5 is a schematic representation of a roof rack assembly 500 for a vehicle 502. The roof rack assembly 500 includes a driver side light-emitting roof rack bar 504 and a passenger side light-emitting roof rack bar 506. The driver side bar 504 is driven by a first emitter 508, and the passenger side bar 506 is driven by a second emitter 510. The two emitters 508, 510 may be powered by the main onboard vehicle power supply 512, as described above. For the sake of clarity and simplicity, the associated illumination electronics modules (or module) are not shown in FIG. 5.

For this embodiment, the light-emitting bars 504, 506 are controlled and driven in response to turn signal indicator commands of the vehicle 502. In other words, the driver side light-emitting roof rack bar 504 flashes when the driver has activated the left turn signal, and the passenger side light-emitting roof rack bar 506 flashes when the driver has activated the passenger side light-emitting roof rack bar 506. Accordingly, the two emitters 508, 510 may be operatively coupled to a turn signal control module 514 of the vehicle 502. In practice, the emitters 508, 510 may be used in conjunction with the traditional turn signal lights deployed on the vehicle 502. Moreover, the light-emitting bars 504, 506 may be capable of supporting turn signal functionality, running lamp functionality, parking light functionality, interior light functionality, door-actuated passenger compartment lighting, and/or basic lighting functionality. In other words, a vehicle could be suitably configured to activate the light-emitting bars 504, 506 as needed to support more than one operating mode. Indeed, the light-emitting bars 504, 506 could be activated by the turn signal control module 514, the user interface element 414 (see FIG. 4), and/or the key fob 342 (see FIG. 3), depending upon the implementation and deployment options.

Figure 6:
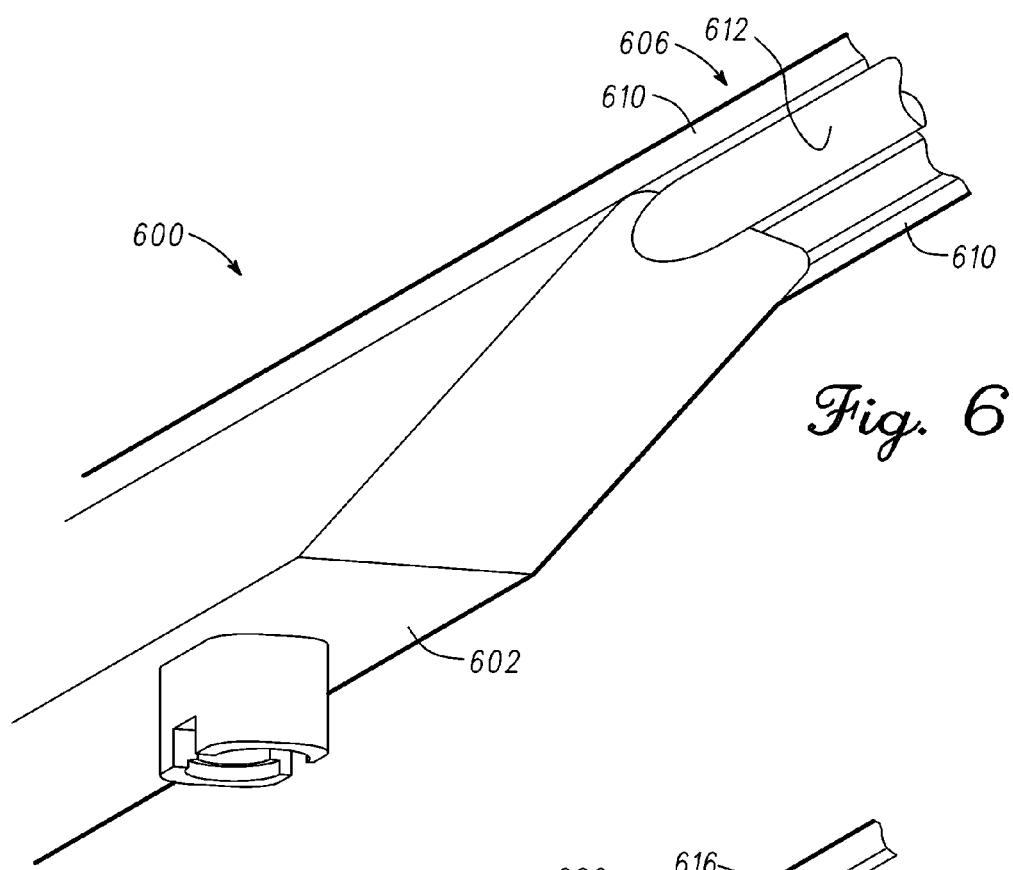
FIG. 6 is a bottom perspective view of a portion of an exemplary embodiment of a roof rack assembly.

As described above with reference to FIG. 3, a light-emitting bar of a roof rack assembly preferably includes an illumination element integrated therein. In this regard, FIG. 6 is a bottom perspective view of a portion of an exemplary embodiment of a roof rack assembly 600. The roof rack assembly 600 includes a stanchion 602 and a light-emitting roof rack bar 606, both of which have the general features and characteristics described above for their counterparts in FIG. 3. This particular implementation of the roof rack bar 606 is fabricated from a rolled, extruded, or molded rail 610. The rail 610 is fabricated such that it has a securing feature integrally formed therein. The securing feature is shaped and sized to accommodate the illumination element 612. In other words, the illumination element 612 is attached to the bar 606 and held in place by the securing feature.

Figure 7:
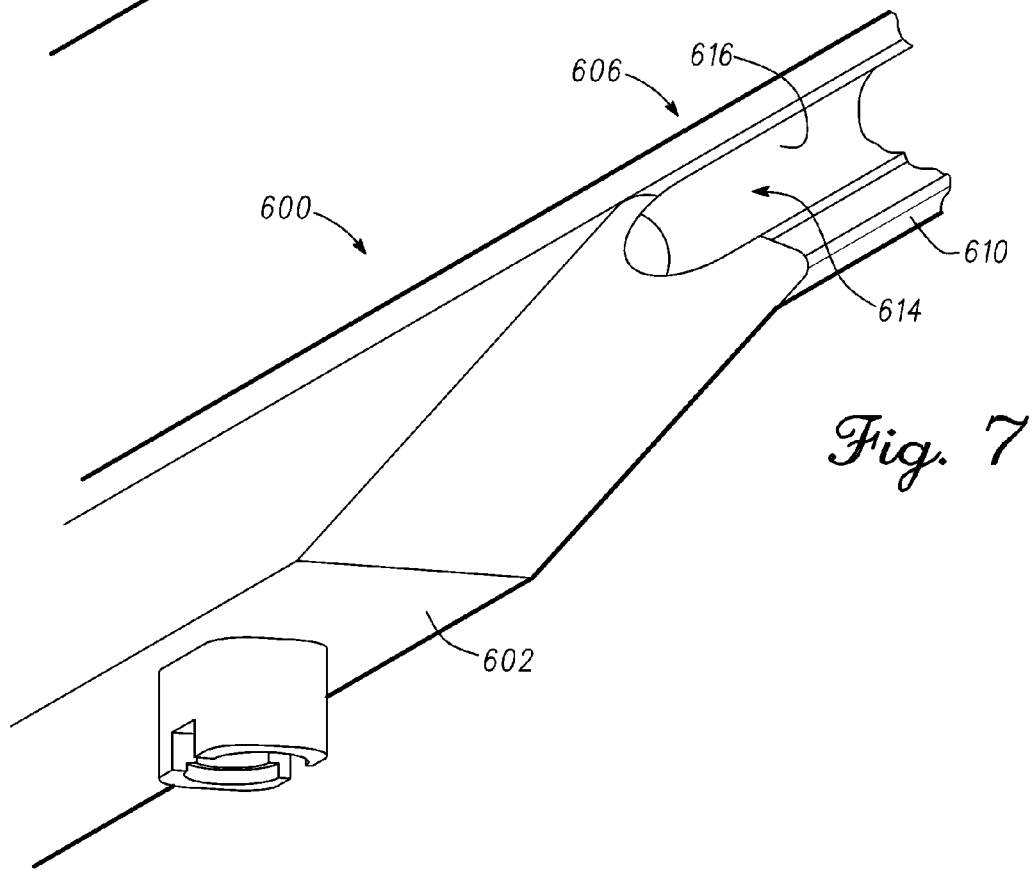
FIG. 7 is a bottom perspective view of the portion of the roof rack assembly shown in FIG. 5, without the illumination element.
Figure 8:
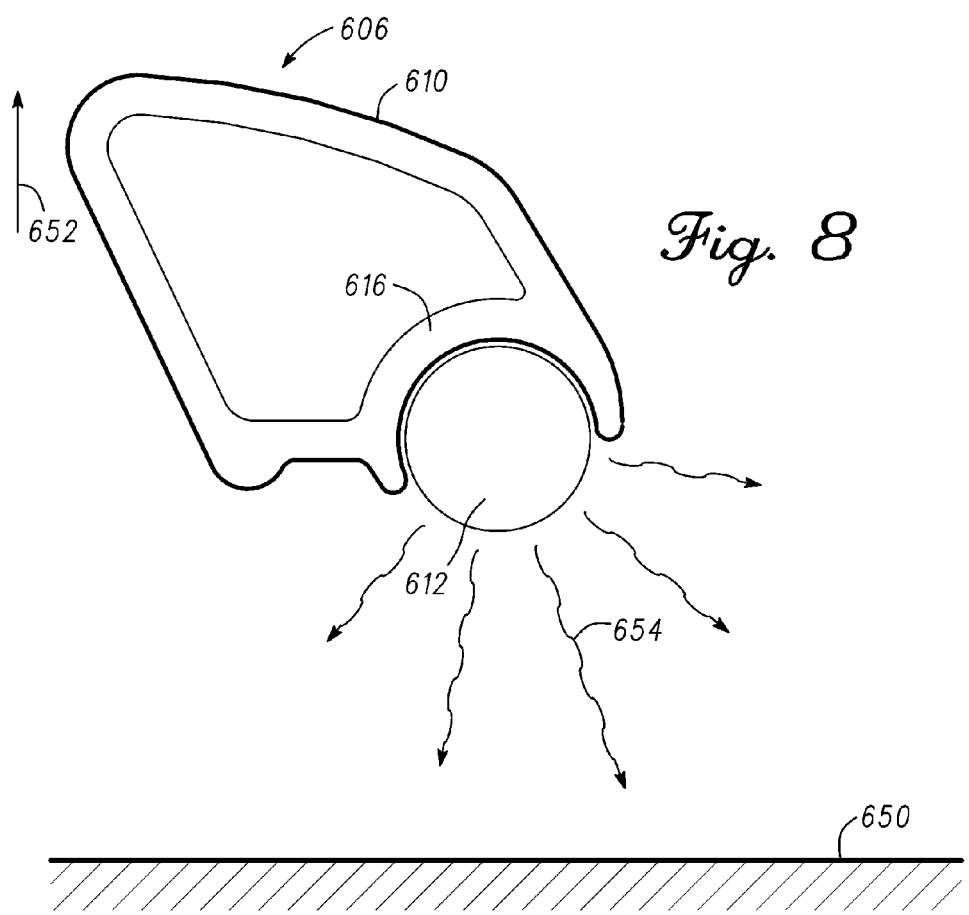
FIG. 8 is a cross sectional view of the light-emitting bar shown in FIG. 6.

FIG. 7 is a bottom perspective view of the roof rack assembly 600, with the illumination element 612 removed, and FIG. 8 is a cross sectional view of the light-emitting roof rack bar 606 with the illumination element 612 in place. FIG. 7 and FIG. 8 depict how the securing feature in this particular embodiment is realized as a C-shaped channel 614 that runs along the length of the rail 610. The channel 614 corresponds to the outer surface of a C-shaped section 616 of the rail 610 (see FIG. 8). The illumination element 612 may be secured within the channel 614 by way of a press-fit engagement, it may be inserted or slid into the channel 614, or it may be glued or bonded in place. After assembly, the illumination element 612 is integrated into the roof rack bar 606 for a streamlined and clean appearance, as shown in FIG. 6.

Figure 9:
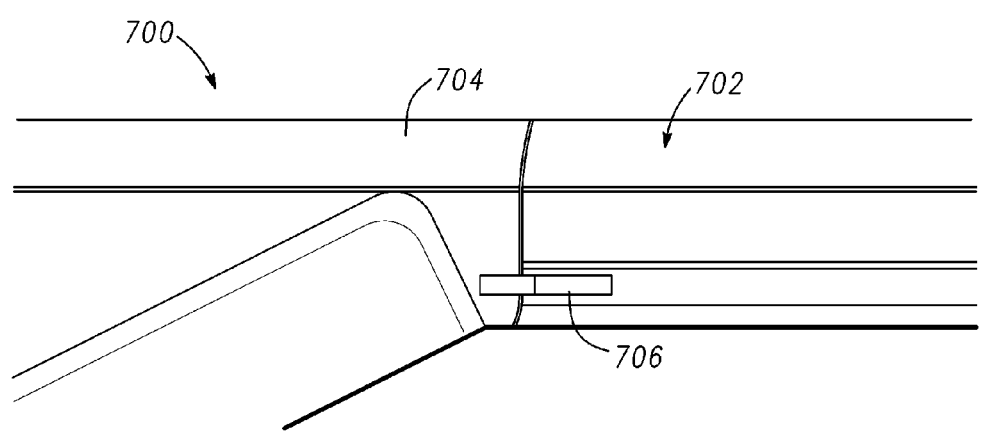
FIG. 9 is a bottom perspective view of a portion of an exemplary embodiment of a roof rack assembly having a rotatable light-emitting bar.

The light-emitting roof rack bar may be affixed to the stanchions in a stationary and non-movable manner. Alternatively, the light-emitting roof rack bar may be rotatably coupled to the stanchions to facilitate rotation about its major longitudinal dimension (or axis) for adjustment of an illumination direction of the illumination element. In other words, the light-emitting roof rack bar and the stanchions can be suitably configured to allow the roof rack bar to spin or twist between the two stanchions. In this regard, FIG. 9 is a bottom perspective view of a portion of an exemplary embodiment of a roof rack assembly 700 having a rotatable light-emitting bar 702 that is rotatably coupled to a stanchion 704. FIG. 9 depicts the bar 702 in its nominal position, i.e., the position that is normally utilized when the roof rack assembly 700 is loaded.

The bar 702 can rotate relative to the stanchion 704, which remains stationary. The roof rack assembly 700 may include a release/lock mechanism 706 that can be actuated by the user to free the bar 702 for rotation and to lock the bar 702 in the desired position. The release/lock mechanism 706 may include or cooperate with a ratchet, a gear element, detents, or other feature (not shown) that allows the bar 702 to "snap" into one or more rotated positions. To rotate the bar 702, the user depresses the release/lock mechanism 706 and rotates the bar 702 to the desired position. Thereafter, the user can disengage the release/lock mechanism 706 to lock the bar 702 in place.

FIG. 10 is a schematic and partially phantom side view of an exemplary embodiment of a roof rack assembly 800 having a rotatable light-emitting roof rack bar 802 that is rotatably coupled to a stanchion 804. FIG. 10 also shows a release/lock mechanism 806 having the functionality and characteristics described above with reference to FIG. 9. The roof rack assembly 800 employs a rotation mechanism 808 for the stanchion 804 (and a similar rotation mechanism for the other stanchion, which is not shown). The rotation mechanism 808 rotatably couples the end of the bar 802 to the stanchion 804 to accommodate adjustment of the illumination direction of the light-emitting roof rack bar 802. The rotation mechanism 808 may be realized using any number of known techniques, technologies, and manufacturing processes. For example, the rotation mechanism 808 may include or cooperate with one or more of the following items, without limitation: a sleeve; a bushing; a bearing; a pin; or the like.

FIG. 8 shows the cross section of the light-emitting roof rack bar 606 in its nominal (not rotated) position. For reference, FIG. 8 depicts the outer surface of the roof 650 of the host vehicle, along with an arrow 652 that represents the vertical or plumb direction. In this position, the light generated by the bar 606 is emitted in a primary direction 654 (represented by the long jagged arrow). In practice, light will also be emitted in other directions in a diffused and unfocused manner. The emitted directions and the "area" defined by the pattern of light generated by the illumination element 612 will be influenced by: the shape of the illumination element 612; the size of the illumination element 612; the optical characteristics of the illumination element 612; the shape, size, and configuration of the C-shaped section 616; the exposed area of the illumination element 612; the optical characteristics of the C-shaped section 616; etc.

FIG. 11 is a cross sectional view that depicts the light-emitting roof rack bar 606 in an inboard rotated position. In contrast to the nominal position shown in FIG. 8, the bar 606 has been rotated such that the illumination element 612 has moved further inward toward the center of the roof 650. In this position, the light generated by the bar 606 is now emitted in a primary direction 656 that is different than the primary direction 654 corresponding to the nominal position.

Figure 12:
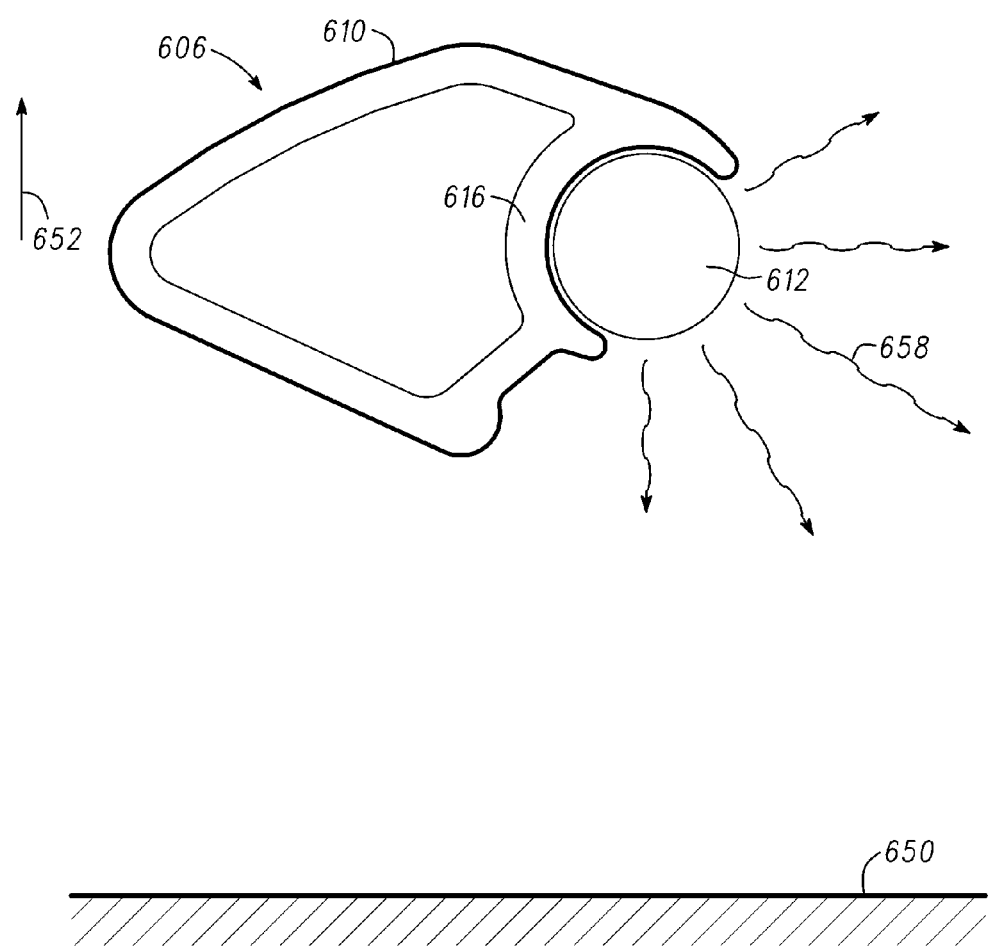
FIG. 12 is a cross sectional view that depicts the light-emitting bar shown in FIG. 8 in a second rotated position.

FIG. 12 is a cross sectional view that depicts the light-emitting roof rack bar 606 in an outboard rotated position. In contrast to the nominal position shown in FIG. 8, the bar 606 has been rotated such that the illumination element 612 has moved further outward toward the outer edge of the roof 650. In this position, the light generated by the bar 606 is now emitted in a primary direction 658 that is different than the primary direction 654 corresponding to the nominal position, and that is different than the primary direction 656 corresponding to the inboard rotated position.

FIGS. 8, 11, and 12 demonstrate how a light-emitting roof rack bar 606 can be configured in an adjustable manner for user convenience and enhanced utility. It should be appreciated that the bar 606 could be adjustable in discrete steps or rotational positions, or it could be adjustable in a continuous manner throughout its overall range of rotation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A roof rack assembly for a vehicle having a roof and an electric power supply, the roof rack assembly comprising:

a front stanchion and a rear stanchion for structural attachment to the roof;

a bar having a front end coupled to the front stanchion such that the front stanchion maintains the front end above the roof and a rear end coupled to the rear stanchion such that the rear stanchion maintains the rear end above the roof, wherein the bar defines an axis extending from the rear end to the front end in a normal direction of vehicle travel, wherein the bar rotates about the axis for adjustment of an illumination direction perpendicular to the normal direction of travel;

an illumination element integrated with the bar and extending without interruption between the stanchions to illuminate in the illumination direction from the front stanchion to the rear stanchion; and an illumination electronics module to drive the illumination element, the illumination electronics module being powered by the electric power supply of the vehicle.

2. The roof rack assembly of claim 1, wherein the bar forms a C-shaped channel extending in the normal direction of vehicle travel without interruption between the front stanchion and the rear stanchion, and wherein the illumination element is positioned in the C-shaped channel.

3. The roof rack assembly of claim 2, wherein the illumination element has a front end received in the front stanchion and a rear end received in the rear stanchion, and wherein the front stanchion and the rear stanchion block illumination in the normal direction of travel and the direction opposite the normal direction of travel.

4. The roof rack assembly of claim 3, wherein the illumination element comprises:
an illumination tube integrated with the bar; and
a light-emitting element to illuminate the illumination tube.

5. The roof rack assembly of claim 4, wherein the light-emitting element is housed within the front stanchion.

6. The roof rack assembly of claim 1, wherein the illumination electronics module drives the illumination element in response to turn signal indicator commands of the vehicle.

7. The roof rack assembly of claim 1, wherein the illumination electronics module drives the illumination element in response to remote key fob commands received at the vehicle.

8. The roof rack assembly of claim 1, wherein the illumination electronics module drives the illumination element in response to user manipulation of an onboard user interface element of the vehicle.

9. A roof rack assembly for a vehicle having a roof, the roof rack assembly comprising:
a front stanchion for structural attachment to the roof;
a rear stanchion for structural attachment to the roof;
a bar coupled between, and held above the roof by, the front stanchion and the rear stanchion, the bar having a channel integrally formed therein and extending in the normal direction of vehicle travel without interruption between the front stanchion and the rear stanchion;
an electric powered light-emitting component attached to the bar and held within the channel, wherein the light-emitting component has a front end received in the front stanchion and a rear end received in the rear stanchion, and wherein the front stanchion and the rear stanchion block illumination in the normal direction of travel and the direction opposite the normal direction of travel;
a front rotation mechanism for the front stanchion; and
a rear rotation mechanism for the rear stanchion, wherein the front rotation mechanism and the rear rotation mechanism rotatable couple the bar to the front stanchion and the rear stanchion to accommodate rotatable adjustment about an axis extending in the normal direction of vehicle travel of an illumination direction of the electric powered light-emitting component.

10. The roof rack assembly of claim 9, wherein the electric powered light-emitting component comprises:
a flexible illumination tube; and
a light-emitting element to illuminate the flexible illumination tube.

11. The roof rack assembly of claim 10, wherein the light-emitting element is housed within the front stanchion or the rear stanchion.

12. The roof rack assembly of claim 9, further comprising an illumination electronics module to drive the electric powered light-emitting component, the illumination electronics module being powered by an onboard power supply of the vehicle.

13. The roof rack assembly of claim 12, wherein the illumination electronics module controls operation of the electric powered light-emitting component in response to remote key fob commands received at the vehicle.

14. The roof rack assembly of claim 12, wherein the illumination electronics module controls operation of the electric powered light-emitting component in response to user manipulation of an onboard user interface element of the vehicle.

15. A vehicle comprising:
a roof;
a first front stanchion attached to and supported by the roof;
a first rear stanchion attached to and supported by the roof;
a first light-emitting roof rack bar rotatably coupled between, and held above the roof by, the first front stanchion and the first rear stanchion, wherein the first light-emitting roof rack bar defines a first axis extending in a normal direction of vehicle travel, and wherein the first light-emitting roof rack bar rotates about the first axis for adjustment of a first illumination direction perpendicular to the normal direction of travel;
a first illumination electronics module to drive the first light-emitting roof rack bar; and
an onboard power supply to provide operating power to the first illumination electronics module.

16. The vehicle of claim 15, wherein the first light-emitting roof rack bar forms a first C-shaped channel extending in the normal direction of vehicle travel, the vehicle further comprising a first illumination element secured within the first C-shaped channel of the first light-emitting roof rack bar to illuminate in the first illumination direction.

17. The vehicle of claim 16, wherein the first C-shaped channel and the first illumination element extend without interruption between the first front stanchion and the first rear stanchion to illuminate in the first illumination direction from the first front stanchion to the first rear stanchion.

18. The vehicle of claim 17, wherein the first illumination element has a front end received in the first front stanchion and a rear end received in the first rear stanchion, and wherein the first front stanchion and the first rear stanchion block illumination in the normal direction of travel and the direction opposite the normal direction of travel.

19. The vehicle of claim 18 further comprising:
a second front stanchion attached to and supported by the roof;
a second rear stanchion attached to and supported by the roof;
a second light-emitting roof rack bar rotatably coupled between, and held above the roof by, the second front stanchion and the second rear stanchion, wherein the second light-emitting roof rack bar defines a second axis extending in a normal direction of vehicle travel, wherein the second light-emitting roof rack bar rotates about the second axis for adjustment of a second illumination direction perpendicular to the normal direction of travel, wherein the second light-emitting roof rack bar forms a second C-shaped channel extending in the normal direction of vehicle travel without interruption between the second front stanchion and the second rear stanchion;

a second illumination element secured within the second C-shaped channel of the second light-emitting roof rack bar and extending without interruption between the second front stanchion and the second rear stanchion to illuminate in the second illumination direction from the second front stanchion to the second rear stanchion, wherein the second illumination element has a front end received in the second front stanchion and a rear end received in the second rear stanchion, and wherein the second front stanchion and the second rear stanchion block illumination in the normal direction of travel and the direction opposite the normal direction of travel; and a second illumination electronics module to drive the second light-emitting roof rack bar, wherein the onboard power supply provides operating power to the second illumination electronics module.

\* \* \* \* \*